Figure 2:
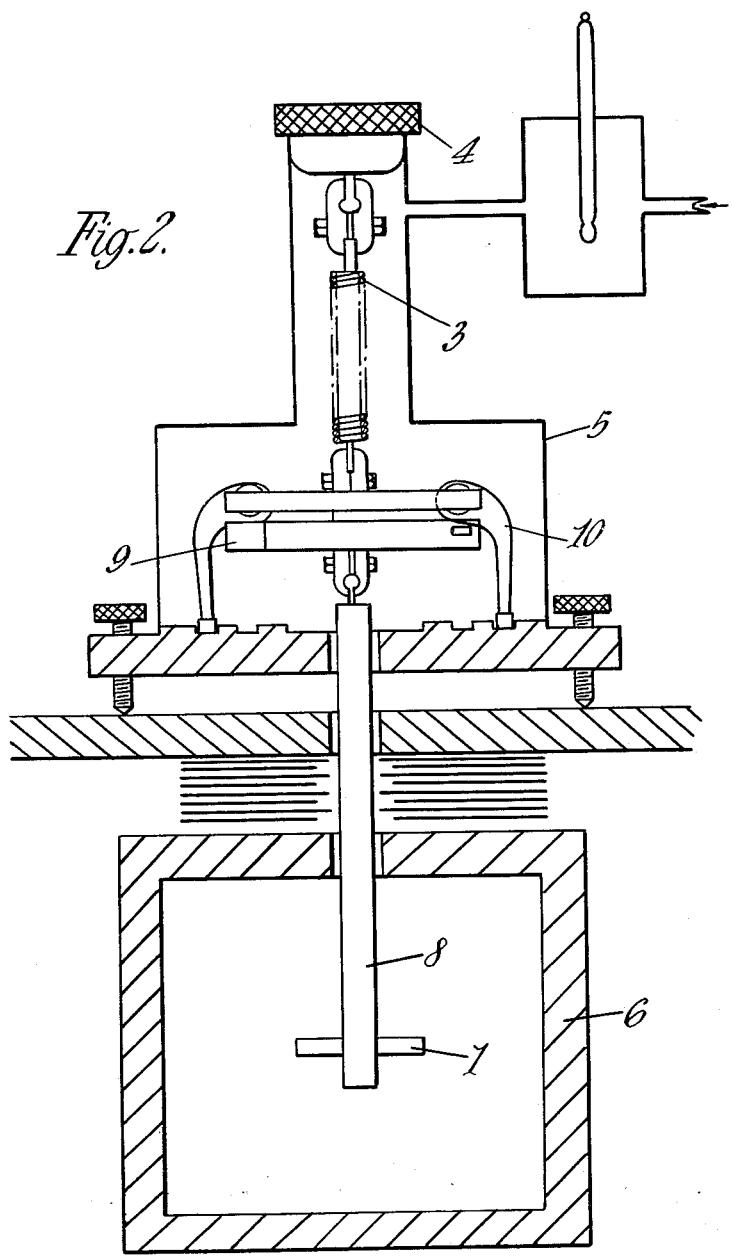

July 6, 1965
D. SMART
3,192,763
APPARATUS FOR DETERMINING THE COEFFICIENT OF THERMAL EXPANSION OF SOLIDS
Filed April 2, 1963
2 Sheets-Sheet 1
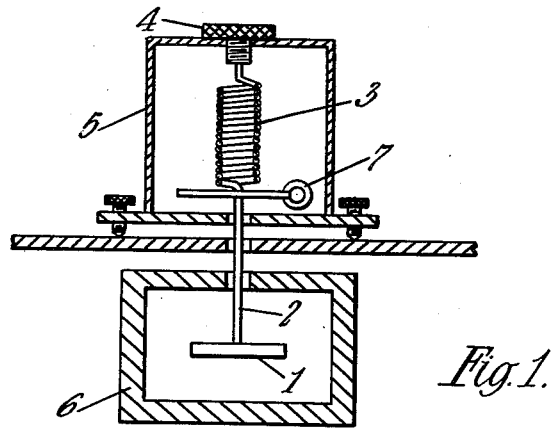
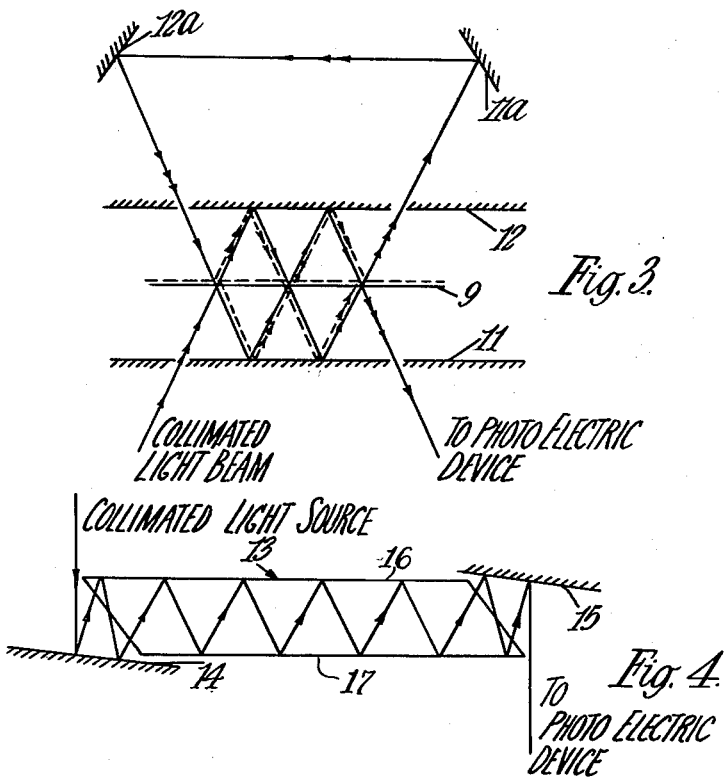

July 6, 1965

D. SMART 3,192,763

APPARATUS FOR DETERMINING THE COEFFICIENT
OF THERMAL EXPANSION OF SOLIDS

Filed April 2, 1963

2 Sheets-Sheet 2

United States Patent Office 3,192,763
Patented July 6, 1965

3,192,763
APPARATUS FOR DETERMINING THE COEFFICIENT OF THERMAL EXPANSION OF SOLIDS
Desmond Smart, Newcastle-upon-Tyne, England, assignor to C. A. Parsons & Company Limited, Newcastle-upon-Tyne, England, a British company
Filed Apr. 2, 1963, Ser. No. 270,016
Claims priority, application Great Britain, Apr. 6, 1962, 13,230/62
5 Claims. (Cl. 73—16)

This invention relates to apparatus for determining the coefficient of thermal expansion of solids.

The object of the invention is to provide apparatus for determining the coefficient of thermal expansion of a solid which does not involve measurement of length.

The invention consists in a method of determining the coefficient of thermal expansion of a solid body in which the body is suspended to form a torsional pendulum and the periodic time of oscillation of the body measured at two different temperatures in order to determine the changes of radius of gyration of the body as a result of the temperature change.

The invention also consists in apparatus for carrying out the method of the preceding paragraph comprising a spring the torsional constant of which is known, the solid being suspended from one end of the spring whilst the other end is fixed, means for changing the temperature of the solid and means for measuring the periodic time of oscillation of the solid.

The invention also consists in apparatus in accordance with the preceding paragraph in which the spring is a quartz spring and the means for changing the temperature of the body is a furnace in which the body is located.

The invention also consists in apparatus in accordance with either of the preceding two paragraphs incorporating a device for counting oscillations of the solid body under test which device comprises a plane mirror mounted so as to oscillate with the body and lying in a plane at right angles to the axis of oscillation, the mirror having a small aperture therein, means for producing a collimated beam of light from a point source and directing said beam on to the mirror and a photoelectric device adapted to receive light through the aperture in the mirror in a given position of the mirror.

The invention also consists in apparatus in accordance with the preceding paragraph in which fixed plane mirrors are arranged on either side of the oscillating mirror so that the collimated light suffers multiple reflection between the fixed mirrors before falling on the photoelectric device.

The invention also consists in apparatus in accordance with either of the first two of the preceding four paragraphs incorporating a device for counting oscillations of a solid body under test which device comprises a prism having two parallel sides lying in planes perpendicular to the axis of the oscillation said sides being reflecting surfaces and means are provided to direct a collimated beam of light from a point source into the prism and from the prism after multiple reflection therein to a photoelectric device.

The invention also consists in a means for determining the coefficient of thermal expansion of a solid substantially as described below with reference to the accompanying drawings.

Referring to the aforesaid drawings:

FIGURE 1 shows in diagrammatic form apparatus in accordance with one embodiment of the invention, FIGURE 2 shows in diagrammatic form apparatus in accordance with another embodiment of the invention, FIGURES 3 and 4 show a mirror arrangement used in connection with a counting device.

Referring to FIGURE 1 a solid body 1 whose coefficient of thermal expansion is to be determined, is suspended by means of a wire 2 of a material such as molybdenum or tantalum from the lower end of a quartz spring 3. The spring is fixed via a torsion head 4 to a draught shield 5. The body is located in a furnace 6 and a device 7 acts as an exciter for the oscillations and also a counter for the purpose of determining the periodic time of oscillation.

The system is first caused to oscillate about the axis of the wire 2 without the solid at a given temperature ($\theta 1$). The periodic time ($t$) is then determined. The body is then attached to the wire 2 and the system caused to oscillate as before at the same temperature $\theta 1$ and the new period time $t_{\theta 1}$ is determined.

The temperature of the body is then raised to $\theta 2$ and the system caused to oscillate as before and the new periodic time $t_{\theta 2}$ determined.

The coefficient of thermal expansion is then determined as follows:

Let
I be the moment of inertia of the system about the suspension axis in say gm./cm.$^2$,
$M_1$ be the mass of the specimen in grams,
$M_2$ be the mass of the rest of the system in grams,
$K_{1\theta 1}$ be the radius of gyration, in centimetres, of the specimen about the suspension axis at temperature $\theta 1$,
$K_{1\theta 2}$ be the radius of gyration in centimetres of the specimen about the suspension axis at temperature $\theta 2$,
$K_2$ be the radius of gyration of the rest of the system about the suspension axis in centimetres (cm.),
$\lambda$ be the torsional constant of the quartz spring in dyne-centimetres per radian,
$\phi$ be the angular deflection of the system in radians,
$\ddot{\phi}$ be the angular acceleration of the system at any instant,
$t$ be the periodic time of the system excluding the specimen when oscillating at temperature $\theta 1$,
$t_{\theta 1}$ be the periodic time of the system including the specimen at temperature $\theta 1$,
$t_{\theta 2}$ be the periodic time of the system including the specimen at temperature $\theta 2$.

The restoring couple at any instant is $I\ddot{\phi}$ $$\therefore \lambda \phi = I\ddot{\phi}$$

The periodic time is given by $$2\pi\sqrt{\frac{I}{\lambda}}$$

For the system without the specimen we can write $$t = 2\pi\sqrt{\frac{M_2 K_2^2}{\lambda}}$$

$$M_2 K_2^2 = \frac{\lambda t^2}{4\pi^2} \qquad (1)$$

For the system with the specimen we can write for temperature $\theta 1$ $$M_1(K_{1\theta})^2 + M_2 K_2^2 = \frac{\lambda(t_{\theta 1})^2}{4\pi^2} \qquad (2)$$

For the system with the specimen oscillating at temperature $\theta 2$ we can write $$M_1(K_{1\theta 2})^2 + M_2 K_2^2 = \frac{\lambda(t_{\theta 2})^2}{4\pi^2} \qquad (3)$$

Combining Equations 1, 2 and 3 we have $$\frac{M_1(K_{1\theta 2})^2}{M_2(K_{1\theta 1})^2} = \frac{\frac{\lambda}{4\pi^2}[(t_{\theta 2})^2 - t^2]}{\frac{\lambda}{4\pi^2}[(t_{\theta 1})^2 - t^2]}$$

whence $$\frac{K_{1_{\theta_2}}}{K_{1_{\theta_1}}} = \frac{\{[(t_{\theta_2})^2 - t^2]\}^{1/2}}{\{[(t_{\theta_1})^2 - t^2]\}}$$

and $$\frac{K_{1_{\theta_2}}}{K_{1_{\theta_1}}} - \left| = \left\{\frac{[(t_{\theta_2})^2 - t^2]}{[(t_{\theta_1})^2 - t^2]}\right\}^{1/2} - \right|$$

Now the mean coefficient of thermal expansion between $\theta 1$ and $\theta 2$ is given by $$\frac{K_{1_{\theta_2}} - K_{1_{\theta_1}}}{K_{1_{\theta_1}}(\theta 2 - \theta 1)}$$

∴ The mean coefficient of thermal expansion =

$$\frac{\left[\frac{(t_{\theta_2})^2 - t^2}{(t_{\theta_1})^2 - t^2}\right] - |}{\theta 2 - \theta 1}$$

Thus the measurement of the coefficient of expansion or the expansion involves only the measurement of three intervals of time and two temperatures.

As an example of a rough calculation for a uranium specimen 4″ long whose coefficient of expansion is about $1.6 \times 10^{-5}$ per °C., a rise in temperature of 10° C. would cause a change in the periodic time of the pendulum of about 1 part in $10^4$. For a typical pendulum having a period of about ½ second, Gaussian timing of 1000 oscillations will easily detect this change and only occupies 10 minutes.

In practice Gaussian timing of 1000 oscillations would detect a very much smaller change in period than 1 part in $10^4$ and digital counting techniques are available which would time a single oscillation with an accuracy of 1 part in $10^6$.

An advantage of the method described is that it does not require precise measurement of length or the need for making allowances for the expansion of other materials usually associated with such a measurement. The specimen is not constrained in any way and there is no reason why the method should not be used at very high temperature (say 1000° C. to 2000° C.) or even up to 3000° C. in a graphite furnace.

The specimen shape is not critical as the period about three different non-parallel axes in the body can be measured and three simultaneous equations obtained which can be solved to give the coefficients of expansion perpendicular to the relevant axis of suspension.

FIGURE 2 shows a variation of the apparatus in FIGURE 1 using a torque tube 8 to hold the specimen. Such an arrangement is useful for high temperature operation where it may be necessary to use graphite for suspending the specimen. The device for counting the oscillations comprise a mirror 9 mounted so as to oscillate with the specimen and an exciter coil 10 to produce the oscillations. Light from a small source such as a pinhole is collimated and directed on to the mirror 9 and is reflected through a small aperture on to a photoelectric device. The light beam will only be reflected on to the photoelectric device with the mirror 9 in one position, and, if this position is any other than the extremity of the oscillation, three pulses will be produced from the photoelectric device during one oscillation of the mirror 9. Thus the interval between the first and third of any three consecutive pulses from the photoelectric device is equal to the period of the pendulum.

In order to time the pulses they are first amplified and the first and third of them are arranged to start and stop a timing mechanism. The timing mechanism must be accurate and preferably a crystal controlled electronic timing device is used.

A suitable form of photoelectric device is a photomultiplier tube as this has a short response and recovery time.

The arrangement described above could become inaccurate if any mode of oscillation other than vertical or angular occurred. To overcome this possible defect a self-compensating device can be used. A suitable device is shown in FIGURE 3. The mirror on the oscillating wire or torque tube is represented diagrammatically by a line 9, on either side of which are fixed mirrors 11 and 12. Collimated light from a small source suffers multiple reflection between the fixed mirrors 11 and 12 and the mirror 9 and mirrors 11a, and 12a. If the mirror 9 moves to the position of the dotted line all that happens is that the path length between the mirror 11 and mirror 9 is lengthened by a given amount and that between mirror 9 and mirror 12 is shortened by the same amount. The path of the light beam for such a position of the mirror 9 is shown by a dash line and the effect is the same as far as the position of the image falling on the photosensitive device is concerned as the device provides automatic self compensation for any displacement of the mirror in directions perpendicular to its surface. If the mirror 9 moves on its own plane then again there is no effect on the system. The only movement, therefore, which can produce deflection of the light beam from the photoelectric device is angular movement of the specimen and hence of the mirror 9.

The device of FIGURE 3 also serves another useful purpose in that if the pendulum turns through an angle $\phi$ the beam at first reflection moves through $2\phi$, at the second reflection $4\phi$ and so on. This means that after several reflections the beam moves through a large angle for a small angular deflection of the pendulum. Thus the sensitivity of the photoelectric device as a means of detecting the angular position of the pendulum is very much increased.

FIGURE 4 shows an alternative arrangement based on the same principle as used in FIGURE 3. The multiple reflection of the collimated light beam from the source occurs within a prism 13 which is mounted on the pendulum. Light from the source is reflected into one end of the prism 13 from fixed mirror 14 and after multiple reflections between the surfaces 16 and 17 during passage through the prism the light emanates from the prism 13 and is reflected to the photoelectric device by a fixed mirror 15.

I claim:

1. An apparatus for determining the coefficient of thermal expansion of a solid body, said apparatus comprising a spring having a known torsion constant, said spring being suspended with one end fixed, said body being suspended from the other end of said spring to provide a torsional pendulum, means for changing the temperature of said body and means for measuring the periodic time of oscillation of said body at different temperatures.

2. An apparatus as defined in claim 1, in which said spring is a quartz spring and in which said means for changing the temperature of said body comprises a furnace, said body being disposed in said furnace.

3. An apparatus as defined in claim 1, and including a device for counting the oscillations of said body, said device comprising a plane mirror mounted on said pendulum for oscillation with said body, said mirror having a small aperture therein and lying in a plane at right angles to the axis of oscillation of said body, a point light source, means for providing a collimated beam of light from said source and for directing said beam to the surface of said mirror and a photoelectric device disposed in the path of said beam passing through said aperture in a given position of said mirror.

4. An apparatus as defined in claim 3, in which fixed plane mirrors are disposed on opposite sides of said oscillating mirror, whereby said beam is subject to multiple reflections between the surfaces of said fixed mirrors prior to striking said photoelectric device.

5. An apparatus as defined in claim 1, and including a device for counting the oscillation of said body, said device comprising a prism mounted on said pendulum for oscillation with said body, said prism having two spaced parallel reflecting surfaces lying in planes perpendicular to the axis of oscillation of said body and opposite ends through which light enters and leaves said prism, a point light source, means for providing a collimated beam of light from said source and for directing said beam into one end of said prism, said beam being subject to multiple reflections between said surfaces in passing through said prism and a photoelectric device disposed in the path of said beam emanating from the other end of said prism.

No references cited.

RICHARD C. QUEISSER, *Primary Examiner.*